Oct. 21, 1958

G. LIEBMANN 2,857,099

ELECTRICAL ANALOGUE-COMPUTING APPARATUS

Filed Sept. 22, 1953

INVENTOR
Gerhard Liebmann
By Morris & Bateman
ATTORNEYS

United States Patent Office 2,857,099
Patented Oct. 21, 1958

2,857,099
ELECTRICAL ANALOGUE-COMPUTING APPARATUS

Gerhard Liebmann, Aldermaston, England, assignor to Sunvic Controls Limited, London, England, a company of Great Britain Application September 22, 1953, Serial No. 381,587

Claims priority, application Great Britain October 2, 1952

2 Claims. (Cl. 235—61)

This invention relates to electrical analogue-computing apparatus of the kind in which a physical problem is represented by an electrical network.

The invention is more particularly concerned with problems in which there are given boundary conditions which must be satisfied.

The invention is applicable, for instance, in stress-analysis problems such as in determining the stress distribution in a body resulting from externally applied forces, or from centrifugal forces in a rotating body, or due to thermal expansion, in all of which problems there are given boundary conditions.

The present invention comprises electrical analogue-computing apparatus including a pair of identical or geometrically similar resistance networks representing a body or material in connection with which a physical problem is to be solved, and resistances interconnecting corresponding junction points of the two networks, which resistances are chosen to represent the physical properties of the material at each point together with means for feeding currents to the junction points of one of the networks and for observing the resulting potentials so that the currents may be iteratively adjusted until the potential distribution in the second network satisfies the given boundary conditions.

In many mechanical engineering problems it is necessary to determine the stresses arising under the application of external forces, or due to body forces, or thermal expansion. In the science of stress-analysis as applied to so-called "plane stress" problems, it is shown that the stresses can be obtained from the so-called "Airey stress function" $\chi(x, y)$, provided the fourth order partial differential equation $$\Delta^4\chi = \frac{\partial^4\chi}{\partial x^4} + 2\frac{\partial^4\chi}{\partial x^2 \partial y^2} + \frac{\partial^4\chi}{\partial y^4} = f \quad (1)$$

has been solved for certain given boundary conditions for the function $\chi$ and certain of its derivatives. In Equation 1, $f$ is either a constant or a known function of the independent variables $x$ and $y$, or $f$ may be a function of the unknown function $\chi$, for example $f$ may be directly proportional to $\chi$ as in certain vibration problems. In a large class of problems $f=0$.

Figure 1:
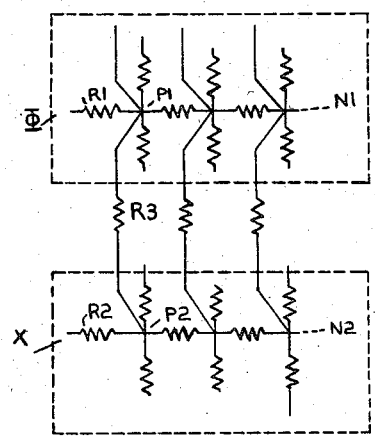
Fig. 1 shows diagrammatically the arrangement of the cascaded networks for carrying out the invention using pure resistance networks.

The arrangement shown in Fig. 1 comprises two geometrically similar or identical resistance networks $N_1$ and $N_2$, the corresponding mesh nodes $P_1$ and $P_2$ being connected by resistances $R_3$. The network resistances $R_1$ and $R_2$ have to be in the same ratio everywhere within the two networks, and often will have identical values for the corresponding positions in the two networks; subject to the first named condition the values of $R_1$ (and $R_2$) may be constant throughout the networks or vary according to a prescribed law, for example in the representation of problems of rotational symmetry, where $R_1$ (and $R_2$) are graded inversely proportional to the distance of the point $P_1$ (or point $P_2$) from the axis. It is necessary that $R_3 \gg R_1$ and $R_3 \gg R_2$ to avoid undesired interaction of the two networks. In practice, $R_3 = 50R_1$ to $R_3 = 5000R_1$.

It had been shown previously (see for example Liebmann, British Journal Applied Physics, vol. 1, page 92, 1950) that a resistance network $N_2$ of equal value resistances $R_2$ solves the difference equation corresponding to the second order partial differential equation $$\Delta^2\chi = \frac{\partial^2\chi}{\partial x^2} + \frac{\partial^2\chi}{\partial y^2} = g \quad (2)$$

for prescribed boundary conditions of the function $\chi = \chi(x, y)$, the function $g$ being represented by currents $I_2$ being fed in at the network nodes $P_2$:

$$I_2 = -h^2 g/R_2 \quad (3)$$

$h = \Delta x = \Delta y$ being the mesh interval. The boundary values of the function $\chi$ are represented by impressing the required electrical potentials at the boundary nodes of the network $N_2$. Now suppose that the currents $I_2$ are fed from potential sources of relatively high values $\Phi(\Phi \gg \chi)$, located at the points $P_1$ in network $N_1$:

$$I_2 = (\Phi - \chi)/R_3 \cong \Phi/R_3 \quad (4)$$

Combination of Equations 3 and 4 with Equation 2 shows that $$\Phi = -h^2(R_3/R_2)\Delta^2\chi \quad (5)$$

But the potential distribution $\Phi$ at the network nodes $P_1$ is in turn the solution of the differential Equation 2, for its own given boundary values, i. e.

$$\Delta^2\Phi = g = -I_1/h^2 \quad (6)$$

or, using Equation 5, $$\Delta^2(\Delta^2\chi) = \Delta^4\chi = I_1 R_1 R_2/(h^4 R_3) \quad (7)$$

Hence the "cascaded" resistance-network arrangement shown in Fig. 1 solves the fourth order differential Equation 1 provided that the appropriate boundary conditions for $\chi$ are set up on network $N_1$ and for $\Phi$ on network $N_2$, and the currents $$I_1 = f h^4 R_3/(R_1 R_2) \quad (8)$$

are fed into the mesh nodes $P_1$ of network $N_1$. The potential distribution at the nodes $P_2$ of network $N_2$ gives then the wanted solution $\chi$. The stress components, and from these the principal stresses and shear stresses, are then obtained by numerical or graphical differentiation of the function $\chi$ as known in the science of stress-analysis. The sum of the principal stresses is equal to $\Delta^2\chi$, and measurement of the distribution of the function $\Phi$ at the nodes $P_1$ of network $N_1$ gives a useful check on the correctness of the evaluation of the stress components from the function $\chi$.

The networks may be modified locally (as described in the above quoted reference and in greater detail in the Institution of Electrical Engineers Monograph No. 38) to represent local modifications of the boundary shape of the investigated models; of course geometrically identical modifications have to be made in both networks $N_1$ and $N_2$, and the connecting resistances $R_3$ should have values inversely proportional to the modified areas of the network meshes.

The above principle can be extended into the third dimension, to solve problems depending on the three independent variables $x$, $y$, $z$, and governed by an equation of the type $\Delta^4\chi(x, y, z) = f(x, y, z)$, the networks $N_1$ and $N_2$ representing each a three-dimensional model of the problem.

Further, additional "cascades" of networks may be added; each additional cascade is equivalent to performing the operation $\Delta^2$ on the function represented by the potential distribution in the next lower network; e. g. the "cascading" of three networks in this manner represents the partial differential equation $\Delta^6\chi = f$, etc. The process of "cascading" such networks is, however, limited in practice through the potential division owing to the condition $R_3 \gg R^1$, and similar conditions for the following network cascades, so that the voltage level in the lowest network, representing the sought function, is soon reduced to a value where it is submerged in amplifier noise or in stray voltages picked up by the apparatus.

While the use of the network arrangement of Fig. 1 has been described under the conditions where the boundary conditions for $\chi$ and $\Delta^2\chi$ were known, it often occurs in practice that boundary values for $\chi$ and $$\frac{\partial \chi}{\partial x}$$

and $$\frac{\partial \chi}{\partial y}$$

are given. In this case too many boundary conditions are given on network $N_2$ and too few on network $N_1$ to obtain a solution in the straightforward manner. One can, however, overcome this difficulty by an iteration process by setting up the boundary values for $\chi$ on the network $N_2$ and first (arbitrary) boundary values on network $N_1$, and comparing the resulting boundary conditions for $$\frac{\partial \chi}{\partial x}$$

and $$\frac{\partial \chi}{\partial y}$$

with the prescribed boundary conditions for $$\frac{\partial \chi}{\partial x}$$

and $$\frac{\partial \chi}{\partial y}$$

Then modifications are made to the boundary conditions on $N_1$ until the boundary values for $$\frac{\partial \chi}{\partial x}$$

and $$\frac{\partial \chi}{\partial y}$$

measured on the network $N_2$ agree within the desired accuracy with the prescribed boundary values for $$\frac{\partial \chi}{\partial x}$$

and $$\frac{\partial \chi}{\partial y}$$

While this required process of successive adjustments of the boundary values in network $N_1$ and the subsequent comparison of boundary values in network $N_2$ with the prescribed values can be carried out in a systematic manner, and will eventually lead to the required correct distribution, it is found that the speed of solution is very greatly enhanced in this method by the use of the display apparatus forming the subject of British Patent No. 754,113. With the help of this display apparatus it is possible to display simultaneously the difference between the potential values (or potential gradients) existing in the network $N_2$, for example along the boundary of the model set up on network $N_2$, and the prescribed potential values (or potential gradients) for a great number of mesh points, and to watch the approach of the correct final potential distribution in $N_2$ upon adjustments of the boundary values in $N_1$, without taking any intermediate voltage readings, or performing intermediate calculations to check the approach towards the correct solution.

Figure 2:
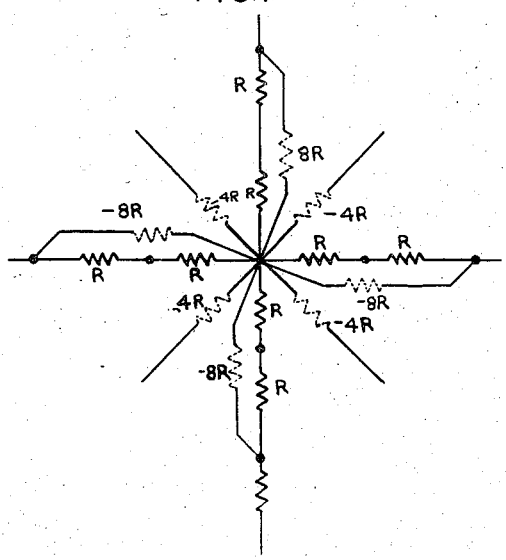
Fig. 2 shows an alternative form of network, using negative resistances.
Figure 3:
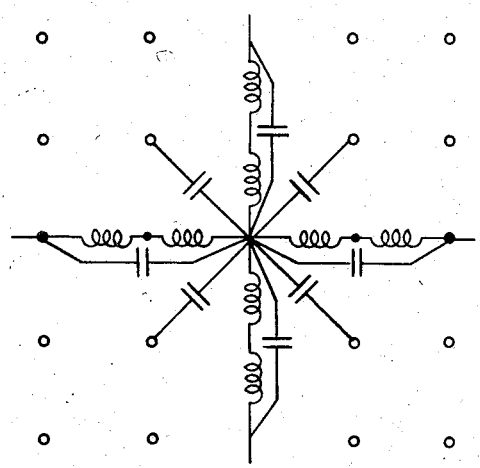
Fig. 3 shows another form using inductances and capacitances.
Figure 4:
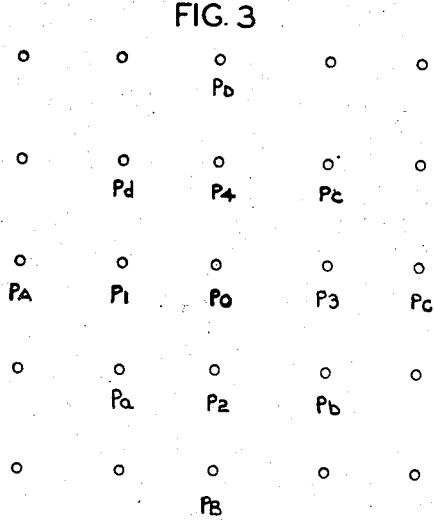
Fig. 4 shows an arrangement of junction points used in explaining the iterative process.

An alternative network arrangement for the solution of Equation 1 is shown in Figs. 2 and 3. Its principle of operation and its design constants are best explained with reference to Fig. 4, which shows a network point $P_0$, its four nearest neighbors in the network in the directions of the variables $x$— and $y$—, viz. points $P_1$, $P_2$, $P_3$ and $P_4$, its four next nearest neighbours in the network in the directions of the variable $x$— and $y$—, viz. points $P_A$, $P_B$, $P_C$, and $P_D$, and its four nearest neighbours in the diagonal directions, viz. points $P_a$, $P_b$, $P_c$ and $P_d$. The distances are $P_0P_1 = P_0P_2 \ldots = P_0P_4 = h$, $P_0P_A = \ldots = 2h$ and $P_0P_a = \ldots = \sqrt{2}h$. One can then write the difference equation which replaces the partial differential Equation 1 in the form:

$$(\Delta^4\chi)_0 = \frac{-8}{h^4}\Big\{[(\chi_1-\chi_0)+(\chi_2-\chi_0)+(\chi_3-\chi_0)+(\chi_4-\chi_0)]$$
$$-\frac{1}{8}[(\chi_A-\chi_0)+(\chi_B-\chi_0)+(\chi_C-\chi_0)+(\chi_D-\chi_0)]$$
$$-\frac{1}{4}[(\chi_a-\chi_0)+(\chi_b-\chi_0)+(\chi_c-\chi_0)+(\chi_d-\chi_0)]\Big\}$$
$$= f_0 \qquad (9)$$

where $\chi_0, \chi_1, \ldots$ are the values of the function $\chi$ at the points $P_0, P_1 \ldots$. If now the functional values $\chi_0, \chi_1, \ldots$ are represented by voltages, one sees that Relation 9 is satisfied by the network shown in Fig. 2, the current $I_0$ to be fed in from an external source at point $P_0$ being determined by the Relation $$I_0 = -h^4 f_0/(8R) \qquad (10)$$

In the network of Fig. 2, the point $P_0$ is joined to its neighbours $P_1 \ldots P_4$ by positive resistances of value $R$, to the network points $P_A \ldots P_D$ by negative resistances of value $-8R$, and to the network points $P_a \ldots P_d$ by negative resistances of value $-4R$; thus each network node $P_0$ forms the junction of twelve resistances, four of which are positive and eight negative (or vice versa, with a corresponding reversal in the sign of the fed-in current $I_0$), and similarly for all other network points within the boundary of the model represented on the network.

The positive resistances may be represented by ordinary resistances, whereas the negative resistances may be synthesized from amplifier valve or "transistor" circuits, or by subsidiary resistance networks containing generators, as known. However, it will be found mostly more advantageous in practice to represent the positive resistances by inductances and the negative resistances by capacitances (or vice versa), using a supply voltage of fixed pulsatance $\omega$ to feed the network. E. g. with a working frequency of 8 kc./s., $\omega \cong 5 \times 10^4$, and with inductances of $L = 0.01$ h. representing the resistances $R$, the capacitances representing $(-4R)$ would have to be $C \cong 0.01$ $\mu$F. and those representing $(-8R)$ would be $C \cong 0.005$ $\mu$F. These values of inductances and capacitances are of such order that the components are relatively small and inexpensive, and that such undesirable effects as stray inductances and stray capacitances can be kept sufficiently small by screening. The resulting "network star" for the network node $P_0$ is shown in Figure 3. The relative values of positive and negative resistances used in networks formed by the repetition of the "network star" arrangement shown in Figure 3 for every interior network point are such that the network is normally free from resonance effects. However, in certain vibration problems the function $f$, used in Equation 1, is proportional to $\chi$ itself, of the form $$f = K \nu_0^2 \chi \qquad (11)$$

where K is a constant depending on the material constants of the problem and on scaling factors, and $\nu_0$ the vibration frequency. In this case it is necessary to feed in positive currents at the mesh nodes proportional to the local functional value $\chi$ or to feed out negative currents. This can be achieved automatically by connecting the mesh nodes to the point of zero potential through negative resistances. E. g. in networks of the type shown in Figure 3, the point $P_0$ would be connected to ground by a suitable capacitance. For an arbitrary value of capacitance, which represents a certain value $\nu \neq \nu_0$ (which may be interpreted as an exciting frequency), still no resonance will take place in this network. However, combination of Equations 10 and 11 shows that resonance will occur for a value of the negative resistance represented by this capacitance-to-ground which is given by $$R' = -8R/(h^4 K \nu_0^2) \qquad (12)$$

The vibration frequencies of such a system can therefore be ascertained by making the network node-to-ground capacitances synchronously adjustable and vary them until resonance arises. From the required values of the capacitances and the material constants and scaling constants, the value of the vibration frequency can then be determined, and the corresponding standing vibration pattern measured.

Both described network arrangements have specific advantages and disadvantages, and the choice of the type of network for solving Equation 1 will therefore depend on circumstances. In the purely resistive network arrangement of Figure 1, it is relatively easy to represent complicated geometries of models, but the signal level in network $N_2$ is low. This last disadvantage is avoided in the network according to Figures 2 and 3, but the network is inherently more complex, and therefore not so easy to adjust for problems of complicated geometry.

Determination of the required boundary conditions may, for example, be carried out by displaying the voltages at the points in question on a cathode ray tube. Traces representing the voltages at all the points in question would be displayed side by side or one over the other against graduations on the screen.

In this manner the variations produced can readily be followed.

Figure 5:
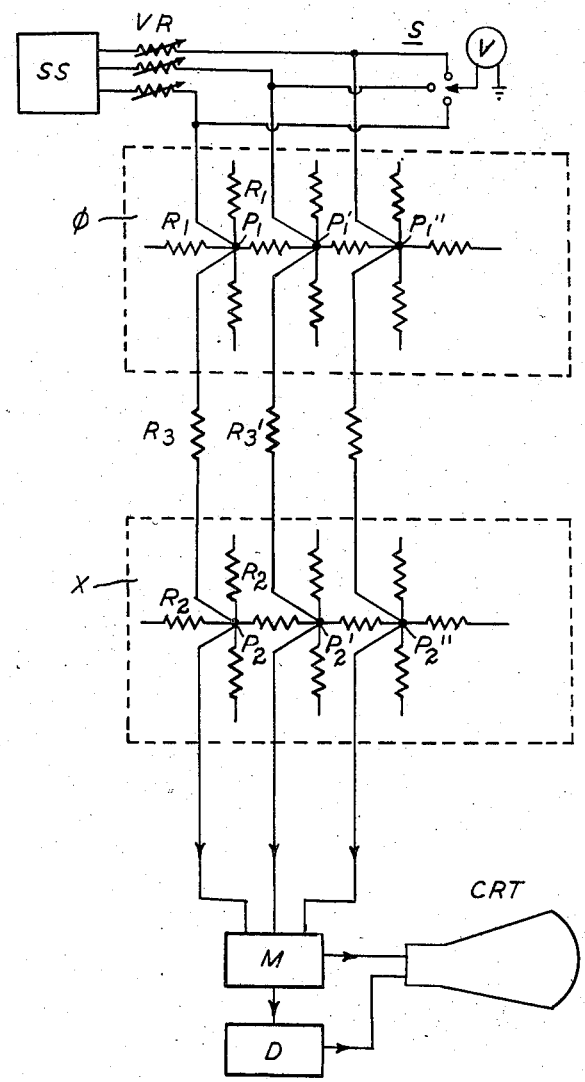
Fig. 5 shows how the networks of Fig. 1 could be connected to display apparatus and to current supply means.

In Fig. 5 a pair of networks $\Phi$ and X, such as are shown in Fig. 1, are connected to current supply apparatus SS and display apparatus CRT. As shown the junction points in the first network $\Phi$ are connected to a supply source SS through variable resistors VR whereby currents fed to the individual junction points may be controlled. At the same time a voltmeter V is connected through a selector switch S to the junction points so that the voltage at any junction point may be measured.

The junction points $P_2$ of the second network X are connected to a multiplex device indicated by the rectangle M whereby the voltages are recurrently fed to the cathode ray tube CRT and may be displayed side by side against graduations representing the boundary values. Deflection apparatus D is operated synchronously with the switching of the voltages to obtain the side by side representation.

It will be appreciated that in applying the apparatus, the junction points of the second network X may be connected to suitable variable potential points e. g. on a potential divider chain, whereby boundary conditions may be imposed initially.

What I claim is:

1. Electrical analogue computing apparatus including a first pure resistance network arrangement representing the mathematical equivalent of a physical problem capable of representation as a fourth order partial differential equation in connection with a body under investigation, said network having junction points corresponding to position points in the body, at least one other pure resistance network which is at least geometrically similar to the first network, pure resistances interconnecting corresponding junction points in the two networks, said interconnecting resistances having values appreciably greater than those of the network impedances, means for feeding currents to the junction points in the first network, means for determining the voltages at the junction points of the second network in relation to given boundary conditions, and means for determining the voltages at the junction points of the first network when the boundary conditions are satisfied in the second network.

2. Electrical analogue computing apparatus including a first pure resistance network arrangement representing the mathematical equivalent of a physical problem capable of representation as a fourth order partial differential equation in connection with a body under investigation, said network having junction points corresponding to position points in the body, at least one other pure resistance network which is at least geometrically similar to the first network, pure resistances interconnecting corresponding junction points in the two networks, said interconnecting resistances having values appreciably greater than those of the network impedances, means for determining the voltages at the junction points of the second network in relation to given boundary conditions, said means comprising a cathode ray tube, means for feeding voltages at the junction points of the network to said cathode ray tube to produce simultaneous traces, and means for applying lateral deflections to said cathode ray tube so that the traces are displaced, and means for determining the voltages at the junction points of the first network when the boundary conditions are satisfied in the second network.

References Cited in the file of this patent
UNITED STATES PATENTS

| | | |
|---|---|---|
| 2,319,106 | Blackburn | May 11, 1943 |
| 2,569,646 | Wade et al. | Oct. 2, 1951 |
| 2,601,382 | Fubini | June 24, 1952 |
| 2,639,089 | Gleyzal | May 19, 1953 |

OTHER REFERENCES

Kron-Tensorial Analysis and Equivalent Circuits of Elastic Structures, Journal of the Franklin Institute, December 1944, pages 399 to 442.